United States Patent
Cheng et al.

(10) Patent No.: US 7,474,483 B2
(45) Date of Patent: Jan. 6, 2009

(54) STRUCTURE OF COLOR ELEMENTS FOR A COLOR FILTER

(75) Inventors: Hsin-An Cheng, Hsinchu (TW); Kuang-Lung Kuo, Taoyuan (TW); Sheng-Shiou Yeh, Miaoli (TW); Tzu-Seng Yang, Hsinchu (TW)

(73) Assignee: TPO Displays Corp., Chu-Nan (TW)

( * ) Notice: Subject to any disclaimer, the term of this patent is extended or adjusted under 35 U.S.C. 154(b) by 40 days.

(21) Appl. No.: 10/948,488

(22) Filed: Sep. 23, 2004

(65) Prior Publication Data
US 2005/0036221 A1 Feb. 17, 2005

Related U.S. Application Data

(63) Continuation-in-part of application No. 10/412,107, filed on Apr. 11, 2003, now abandoned.

(30) Foreign Application Priority Data
Oct. 25, 2002 (TW) .............................. 91125212 A

(51) Int. Cl.
G02B 5/24 (2006.01)
G02B 5/22 (2006.01)
G02F 1/1335 (2006.01)

(52) U.S. Cl. .................... 359/891; 359/885; 349/106
(58) Field of Classification Search ................. 359/890, 359/891, 587, 885, 892; 349/106, 109, 110; 430/7
See application file for complete search history.

(56) References Cited

U.S. PATENT DOCUMENTS

| 3,771,857 | A | * | 11/1973 | Thomasson et al. | ......... 359/587 |
| 4,642,619 | A | | 2/1987 | Togashi | |
| 5,229,232 | A | * | 7/1993 | Longobardi et al. | ............ 430/7 |
| 6,077,634 | A | * | 6/2000 | Phillips | ........................ 430/7 |
| 6,542,209 | B2 | * | 4/2003 | Kim et al. | .................... 349/106 |

FOREIGN PATENT DOCUMENTS

JP 402287405 A * 11/1990 ................. 359/891
JP 9015589 1/1997

* cited by examiner

Primary Examiner—Audrey Y Chang
(74) Attorney, Agent, or Firm—Quintero Law Office

(57) ABSTRACT

A structure of color elements for a color filter. At least a first, second, and third color element are disposed in a delta-type arrangement. An overlapping portion is formed between two adjacent color elements to serve as a light-blocking area. At least one color element is octagonal, having four straight sides and four beveled sides.

36 Claims, 17 Drawing Sheets

STRUCTURE OF COLOR ELEMENTS FOR A COLOR FILTER

CROSS-REFERENCE TO RELATED APPLICATIONS

This is a continuation-in-part of application Ser. No. 10/412,107, filed on Apr. 11, 2003, the teachings of which are incorporated herein by reference.

BACKGROUND

The invention relates to a color filter (CF), and more particularly to a structure of color elements for a color filter. Specifically, the invention is an improvement on a delta-type RGB arrangement to reduce an overlapping area between three adjacent R, G and B elements and reduce an opening area within a non-overlapping portion of three adjacent R, G and B elements, thus promoting color properties, increasing contrast ratio, decreasing light leakage and preventing color mixing.

As scientific technologies and information advance, color filters (CF) have been popularly used in video products, such as color liquid crystal displays, and charge coupled devices and scanners, to obtain color information. With regard to a liquid crystal display (LCD) with light, thin, power-saving and full color features, including super-twisted-nematic (STN) type, thin-film-transistor (TFT) type and metal-insulator-metal (MIM) type, a color filter with three primary colors including red (R), green (G) and blue (B) elements is needed to divide a pixel into R, G and B subpixels. The three primary colors are blended proportionally to create various colors, thus enabling the LCD to display bright, realistic and vivid pictures, enhancing LCD functionality.

The LCD mainly comprises a TFT array substrate, a color filter, and a liquid crystal layer. In a conventional CF process, thin-film color layers including R, G and B layers are successively coated on a glass substrate to serve as R, G, and B elements, after which these must be precisely aligned to pixel areas on the TFT array substrate. In view of manufacturing costs and quality requirements, dyeing, pigment dispersion, printing and electroplating are commonly used to form the R, G and B elements of the color filter. Particularly, pigment dispersion that provides the color filter with high precision and superior light- and heat-resistance has become a major CF process. FIGS. 1A through 1C are top views of stripe, mosaic, and delta RGB arrangement types. The delta-type RGB arrangement provides simplified driving and optimum blend-mode effects, and is thus popularly applied to audio/video products. In addition, a black matrix (BM) is disposed between the R, G, and B elements, shielding TFTs on the TFT array substrate from stray light, and preventing light leakage between pixels.

Recently, the BM pattern has been omitted from the CF substrate to reduce process costs, and the light-blocking area has been replaced by an overlapping portion of adjacent color elements on the CF substrate. FIG. 2A is a top view of a conventional delta-type RGB arrangement with an overlapping portion of adjacent color elements, and FIG. 2B is a cross-section of an overlapping portion of three adjacent color elements shown in FIG. 2A. A conventional color filter 10 comprises a plurality color elements of R, G, and B in a delta-type RGB arrangement. An overlapping portion is additionally formed by adjacent color elements to serve as a light-blocking area. Since each color element has a rectangular profile, however, an overlapping portion 12 is created by three adjacent color elements R, G and B. In FIG. 2B, the overlapping portion 12 is a stack of three color coatings, causing non-uniform distribution in pigment (or dye) thickness on a glass substrate. This protrusion damages uniformity of strength of electric fields and rotation of liquid crystal molecules within pixels, resulting in light leakage, decreased contrast ratio, poor color purity and mixed color.

SUMMARY

Accordingly, embodiments of the invention provide a structure of color elements in a delta-type RGB arrangement for a color filter, in which an overlapping portion of adjacent color elements serves as a light-blocking area. Particularly, for each color element, each corner of a rectangular profile is a faceted profile or a partially-filled pattern to reduce an area of three adjacent color elements overlapping, and reduce an opening area of a non-overlapping portion of three adjacent color elements, thus improving color properties, increasing contrast ratio, reducing light leakage and preventing mixed color.

To achieve these and other advantages, embodiment of the invention provides a structure of color elements for a color filter comprises at least a first color element, a second color element and a third color element in a delta-type arrangement. An overlapping portion is formed between two adjacent color elements to serve as a light-blocking area. In one embodiment, at least one color element is substantially a polygon having at least five sides. Preferably, at least one color element is substantially an octagon, having four straight sides and four beveled sides. In another embodiment, at least one color element includes a polygonal first portion having at least five sides, and a plurality of second portions disposed in a beveled end-point region of the polygonal first portion. Preferably, at least one color element includes an octagonal first portion, and a plurality of second portions disposed in four beveled end-point regions of the octagonal first portion.

To achieve these and other advantages, embodiments of the invention provide a photo mask for fabrication of a color filter. The photo mask includes a plurality of mask elements, each mask element comprising a polygonal first opening with at least five sides. In one embodiment, the mask element further includes a plurality of second openings disposed in a beveled end-point region of the polygonal first opening. Preferably, the mask element includes an octagonal first opening, and a plurality of second openings disposed in four beveled end-point regions of the octagonal first opening.

To achieve these and other advantages, embodiments of the invention provide a method for fabricating a color filter, comprising providing a first substrate comprising a plurality of pixel regions, each pixel region further comprising three sub-pixel regions, sequentially forming a first color element, a second color element, and a third color element layer using a photo mask on each sub-pixel region of the first substrate, wherein the photo mask comprises a plurality of mask elements, each mask element comprising a polygonal first opening with at least five sides.

DESCRIPTION OF THE DRAWINGS

For a better understanding of the invention, reference is made to a detailed description to be read in conjunction with the accompanying drawings, in which.

DETAILED DESCRIPTION

First Embodiment

A first embodiment of the invention is a color filter with a plurality of R, G and B elements in a delta-type arrangement, in which an overlapping portion is formed between two adjacent color elements to serve as a light-blocking area for replacing a conventional BM process. Also, for each color element, each corner of an originally rectangular profile is shaped as a faceted profile to reduce an area of three adjacent color elements overlapping and reduce thickness of the overlapping region, thus improving color properties, increasing contrast ratio, reducing light leakage and preventing mixed color.

Figure 1A:
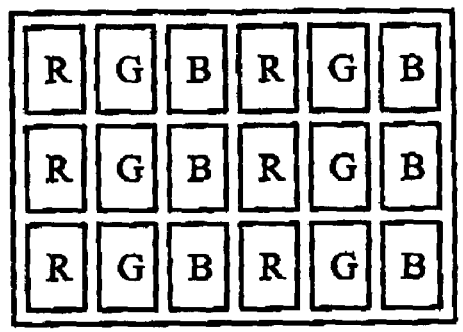
FIGS. 1A through 1C are top views of stripe-type, mosaic-type and delta-type RGB arrangements.
Figure 1B:
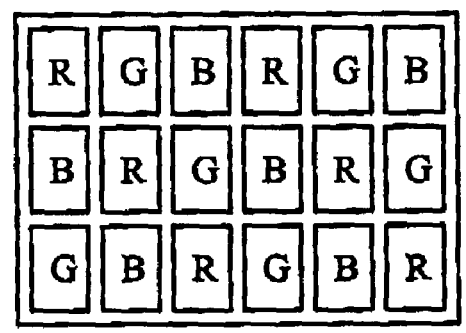
Figure 1C:
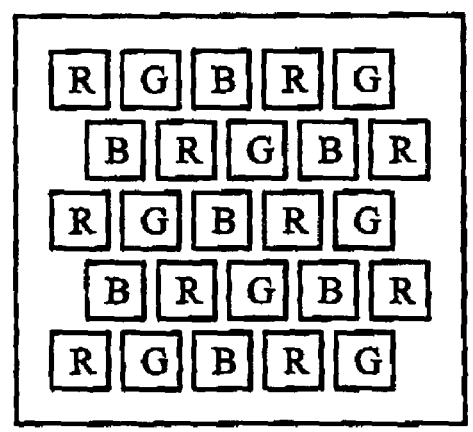
Figure 2A:
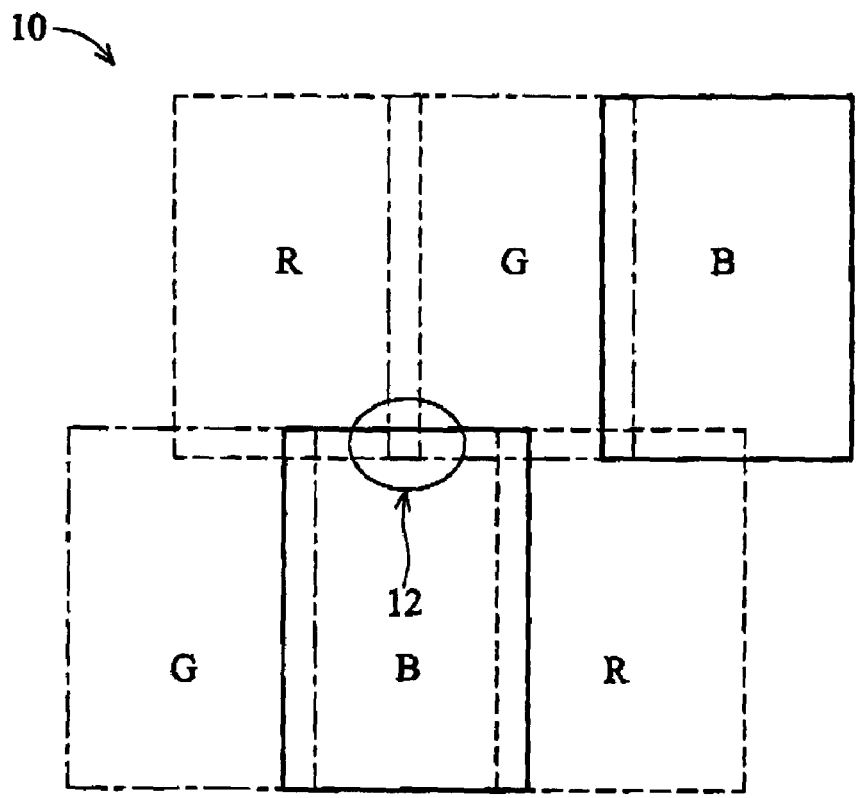
FIG. 2A is a top view of a conventional delta-type RGB arrangement with an overlapping portion of adjacent color elements.
Figure 2B:
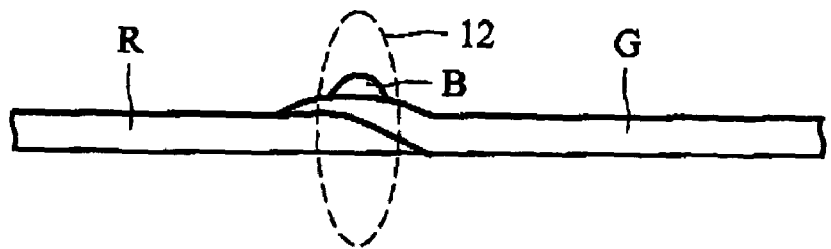
FIG. 2B is a cross-section of an overlapping portion of three adjacent color elements shown in FIG. 2A.
Figure 3A:
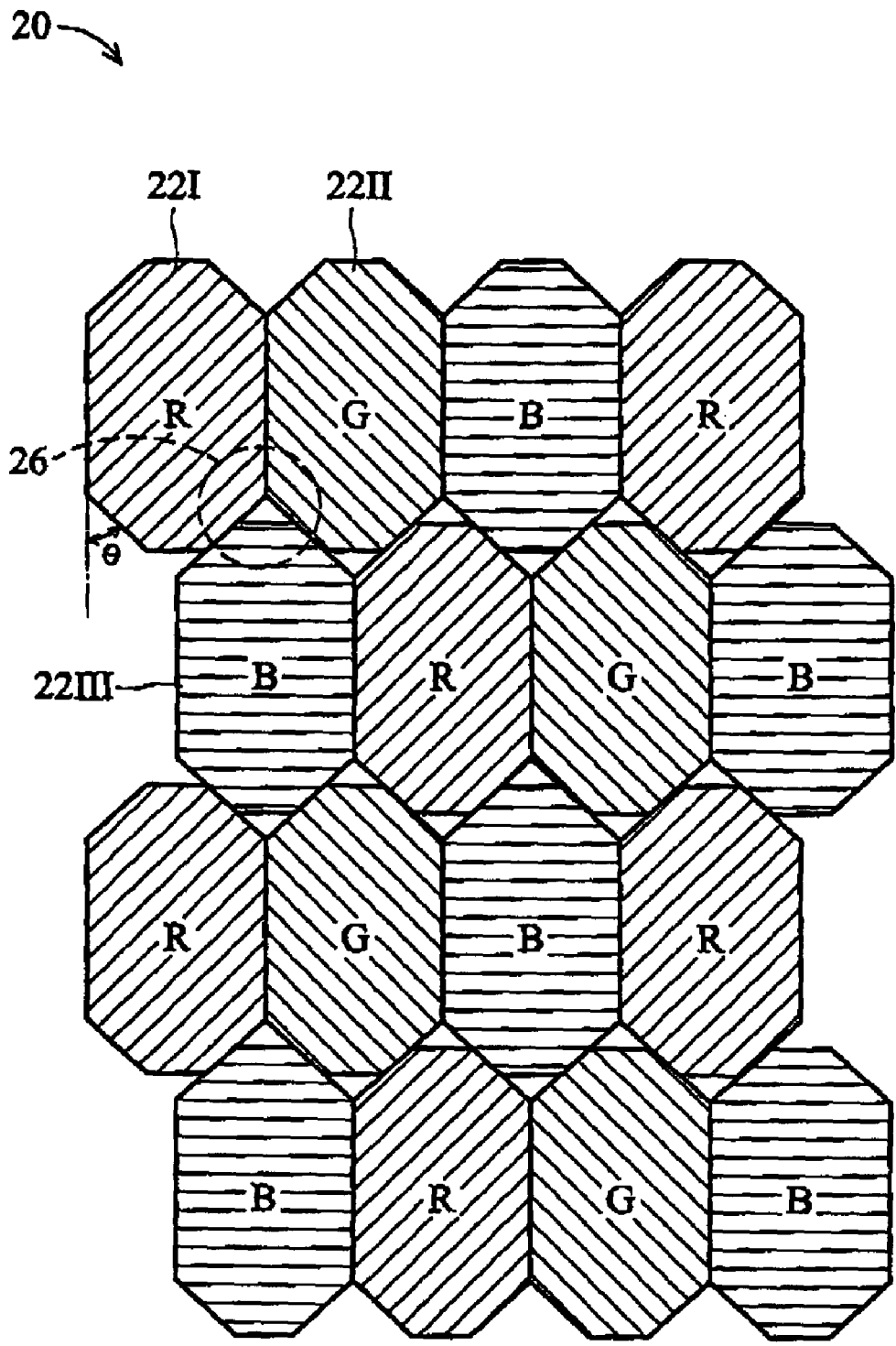
FIG. 3A is a top view of three adjacent color elements according to the first embodiment of the invention.
Figure 3B:
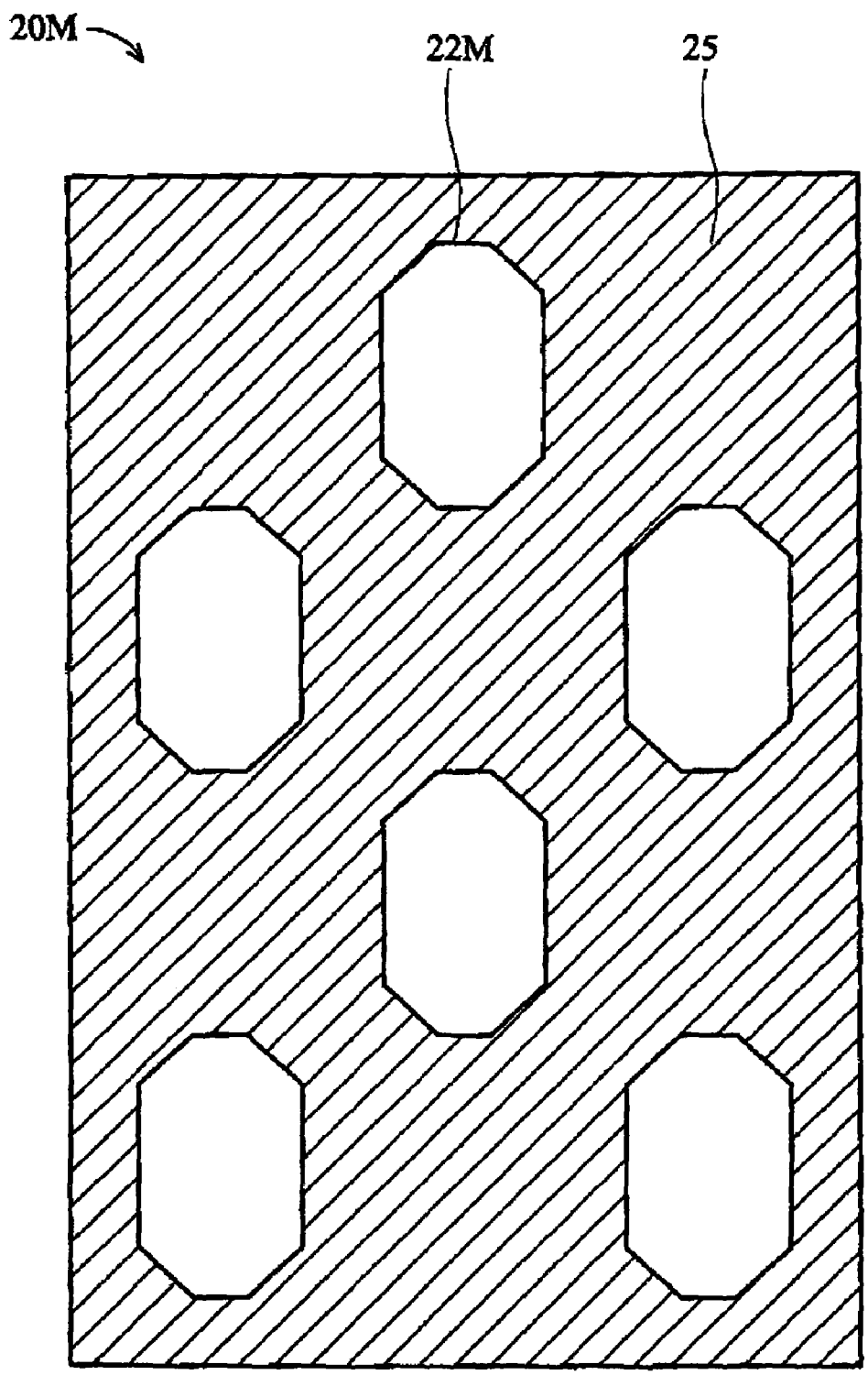
FIG. 3B is a top view of a photo mask according to the first embodiment of the invention.
Figure 3C:
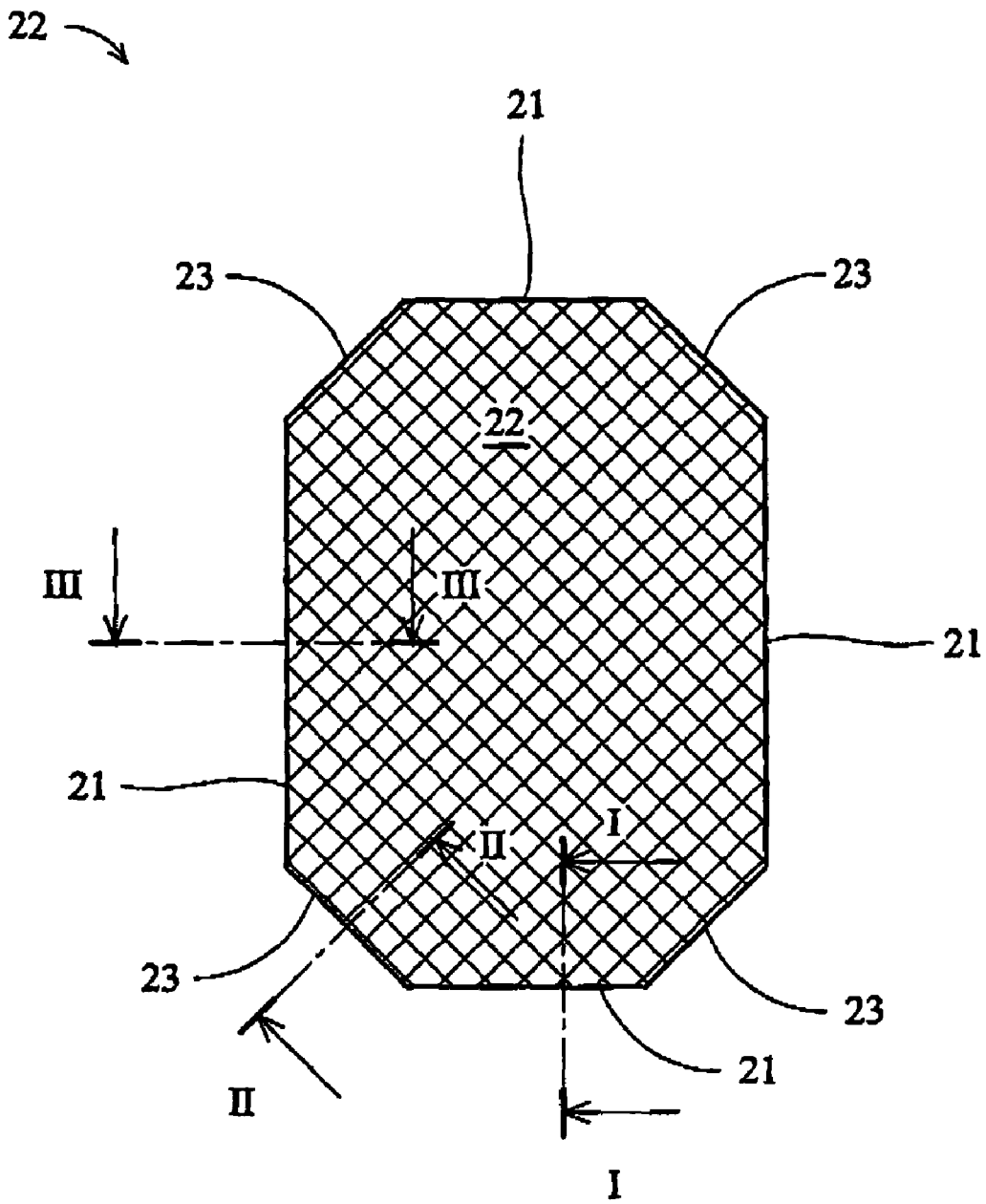
FIG. 3C is a top view of one color element according to the first embodiment of the invention.
Figure 4A:
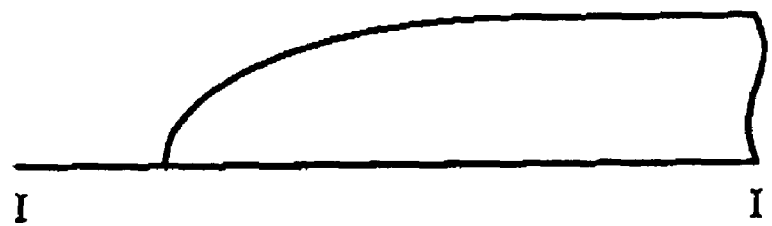
FIG. 4A is a sectional view along line I-I shown in FIG. 3C to show a thickness profile of the color element.
Figure 4B:
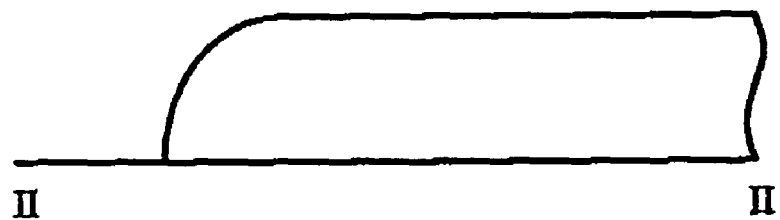
FIG. 4B is a sectional view along line II-II shown in FIG. 3C to show a thickness profile of the color element.
Figure 4C:
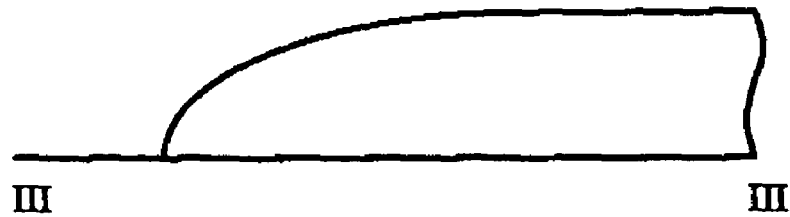
FIG. 4C is a sectional view along line III-III shown in FIG. 3C to show a thickness profile of the color element.

FIG. 3A is a top view of three adjacent color elements according to the first embodiment of the invention. FIG. 3B is a top view of a photo mask according to the first embodiment of the invention. FIG. 3C is a top view of one color element according to the first embodiment of the invention. FIG. 4A is a sectional view along line I-I shown in FIG. 3C illustrating a thickness profile of the color element. FIG. 4B is a sectional view along line II-II shown in FIG. 3C illustrating a thickness profile of the color element. FIG. 4C is a sectional view along line III-III shown in FIG. 3C illustrating a thickness profile of the color element.

In FIG. 3A, a color filter 20 comprises three adjacent color elements 22I, 22II and 22III in a delta-type RGB arrangement, with an overlap formed by two adjacent color elements 22 to serve as a light-blocking area. FIG. 3B is a top view of an applicable photo mask in accordance with embodiments of the invention. The photo mask 20M comprises a plurality of transparent mask element regions 22M and an opaque region 25.

For each color element 22, as shown in FIG. 3C, four corners of an originally rectangular profile have faceted profiles. Thus, the color element 22 is an octagon, having four straight sides 21 and four beveled sides 23. In accordance with process and color property requirements, the length of the straight side 21, the length of the beveled side 23 and the inclination of the beveled side 23 can be appropriately modified. Preferably, the length of the beveled side 23 is less than 8 μm and greater than 0, an included angle θ between the beveled side 23 and the straight side 21 is less than 90° and greater than 0°. This design reduces the thickness of a three-layered protrusion from overlapping at rims of three color elements 22I, 22II and 22III, resulting in improved color properties, increased contrast ratio, reduced light leakage and prevention of mixed color.

A small opening 26 (see FIG. 3A), however, may be found in a non-overlapping portion of the three adjacent color elements 22I, 22II and 22III, generating light leakage. To further reduce the area of the opening 26, the peripheral inclination of the pigment at the beveled side 23 must be decreased, for reasons described in the following. When the color elements 22 are patterned by pigment dispersion, dying, printing or electroplating, a surface extension of the pigment (or color resist) causes the pigment at the beveled side 23 to form a steep rim as shown in FIG. 4B. Comparatively, the pigment at the straight side 21 forms a gradual rim as shown in FIGS. 4A and 4C.

If the pigment at the beveled side 23 can be made to have a gradual rim, rather than a steep rim, the extension distance of the color element at the beveled side 23 is increased, thus reduce the area of the opening 26 (white open area). Detailed descriptions will be explained in second embodiment as follows.

Second Embodiment

The second embodiment of the invention improves on the corners of an originally rectangular profile of the color elements. That is to say, in addition to the octagonal structure, the color element further includes a plurality of second portions disposed in a beveled end-point region of the octagonal color element.

Figure 5:
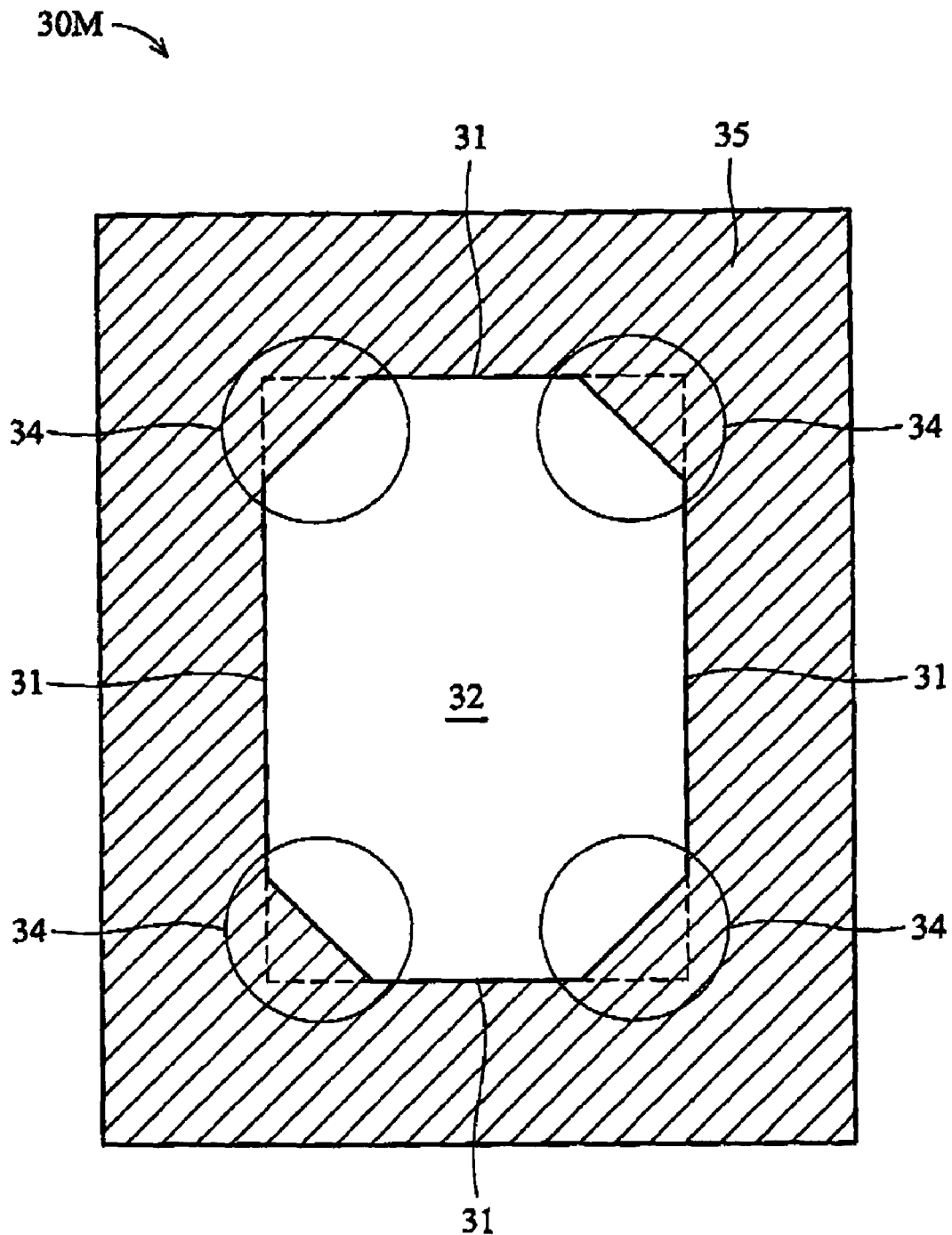
FIG. 5 is a top view of the applicable photo mask in accordance with embodiments of the invention.

An applicable photo mask in accordance with embodiments of the invention is described in detail as follows. FIG. 5 is a top view of the applicable photo mask in accordance with embodiments of the invention. The photo mask 30M comprises a plurality of transparent mask element regions 32 and an opaque region 35. Each mask element region 32 comprises an octagonal first opening 31 and four beveled end-point regions 34. In another embodiment of the invention, the mask element region 32 further comprises a plurality of second openings (not shown in FIG. 5) in the four beveled end-point regions 34.

For the sake of illustration, the first opening 31 of the mask element region 32 can be, but not limited to, an octagon, for example. The first opening 31 of the mask element region 32 can also be a polygon with at least five sides.

Figure 6A:
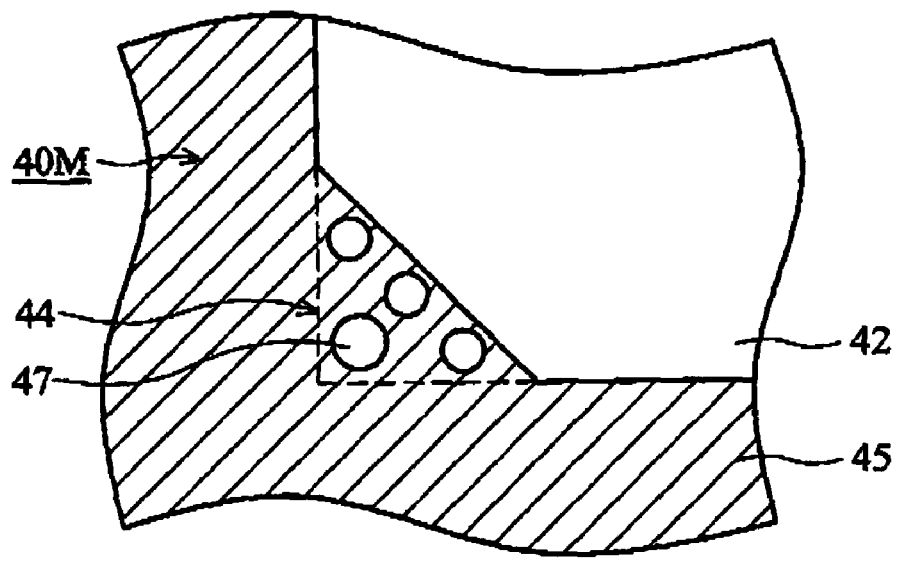
FIG. 6A through FIG. 6C are partial top views of the photo masks in accordance with embodiments of the invention.
Figure 6B:
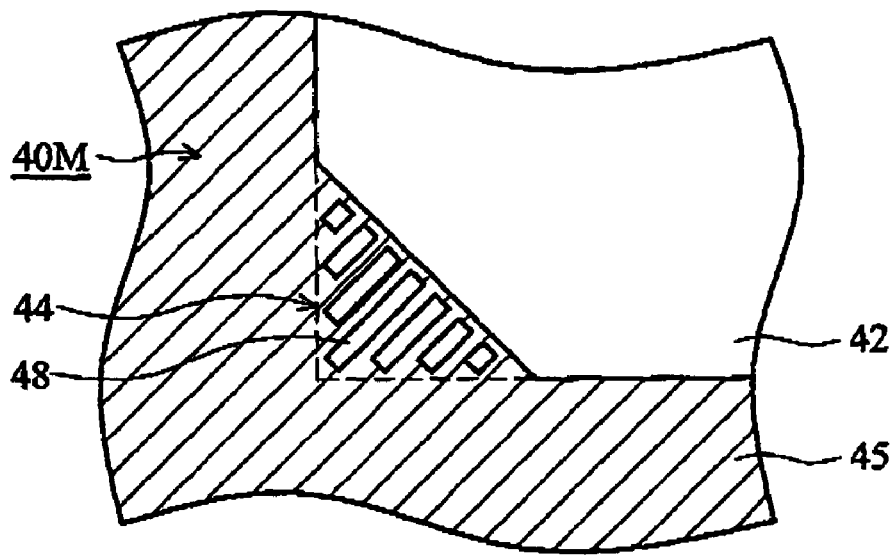
Figure 6C:
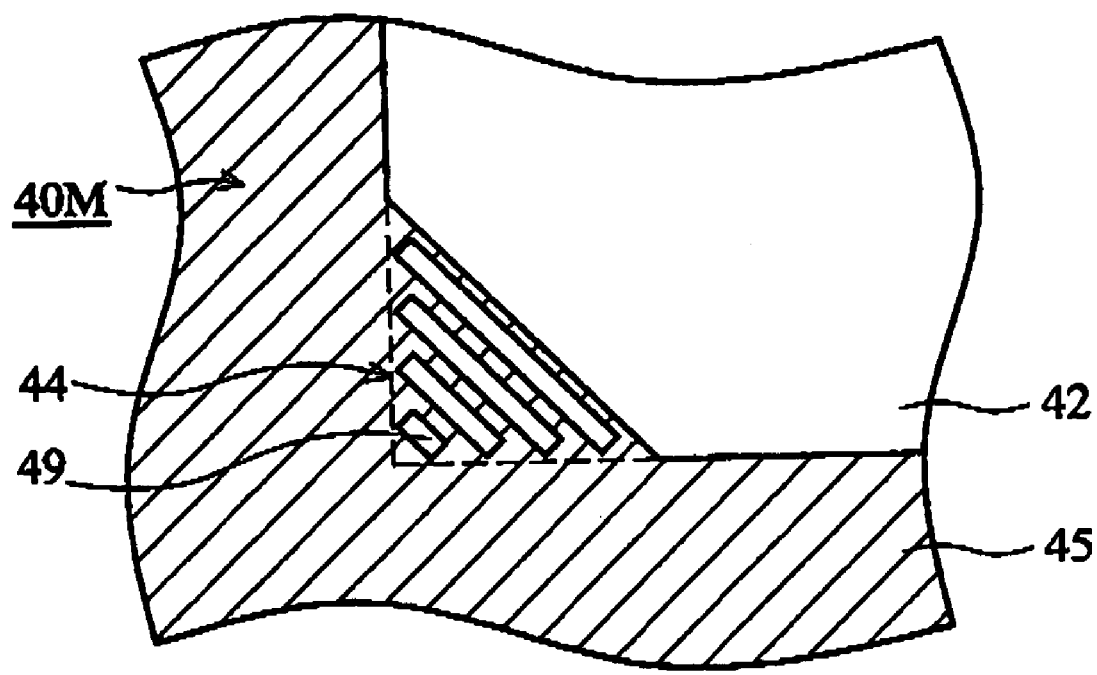

FIG. 6A through FIG. 6C are partial top views of the photo masks in accordance with embodiments of the invention. Each beveled end-point region 44 comprises a hollowed-out pattern described in the following. Referring to FIG. 6A, the photo mask comprises a plurality of mask elements 40M. Each mask element 40M comprises an octagonal first opening 42 and a plurality of second opening 47. The octagonal first opening 42 is the same octagon as in FIG. 5. The second openings 47 are disposed in four beveled end-point regions 44 of the octagonal first opening 42. In FIGS. 6A to 6C, the second openings 47 are not connected to the first opening 42. The dimensions, size, and number of the second openings 47 are not limited to the disclosed embodiments. The second openings 47 at the four beveled end-point regions 44 as shown in FIG. 6A are a plurality of circular openings.

The photo masks shown in FIGS. 6A to 6C can be used to fabricate color filters. The photo mask design can be that the spacing (or overlap) between two adjacent mask elements for different colors is from −10 μm to 10 μm. −10 μm means that two adjacent mask elements for different colors is spaced apart by −10 μm. 10 μm means that two adjacent mask elements for different colors overlap with 10 μm. Thus, in the produced color filter, the overlapping range at the rim of each color element 22 can be approximately 0~10 μm.

FIGS. 6B and 6C are variations of the second openings at the four beveled end-point regions 44. In FIG. 6B, the second openings 48 are strip-shaped openings disposed at inclines from the upper-right to the lower-left. In FIG. 6C, the second openings 49 are strip-shaped openings disposed at inclines from the upper-left to the lower-right.

Accordingly, color filters can thus be formed using mask elements as shown in FIGS. 6A through 6C. A color element 22D in FIG. 3D can be formed using mask elements 40M as shown in FIGS. 6A through 6C. The color element 22D comprises an octagonal first portion 22a and a second portion 22b at the beveled end-point region 24 of the octagonal first portions 22a. The second portion 22b of the color element is a meniscus with curved profile.

Figure 3D:
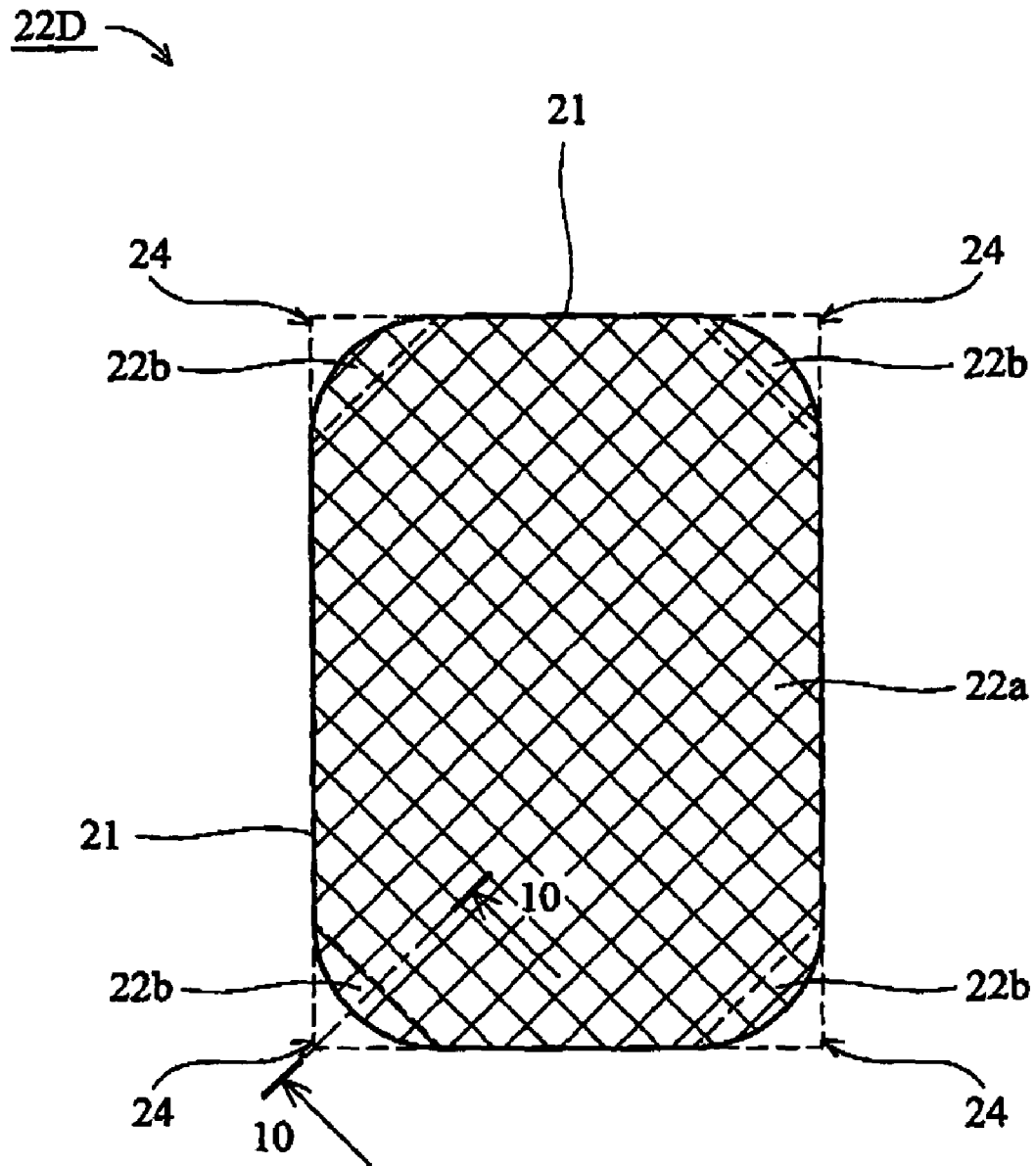
FIG. 3D is a top view of one color element according to the second embodiment of the invention.
Figure 10:
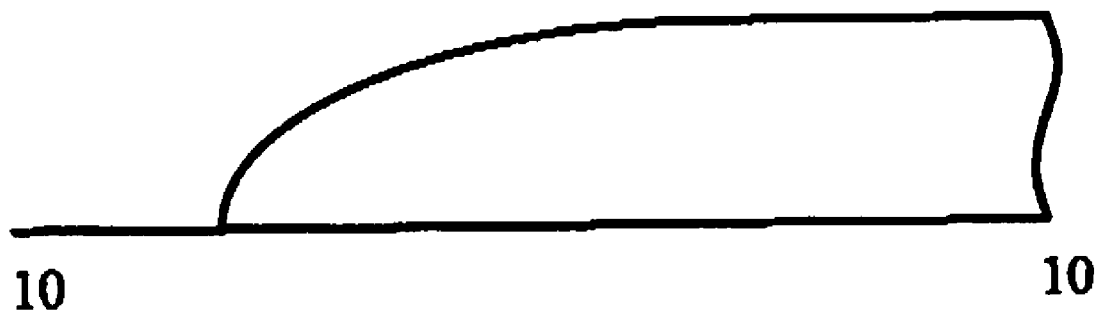
FIG. 10 is a sectional view along line 10-10 shown in FIG. 3D to show a thickness profile of the color element.

Compared with the color element 22 in FIG. 3C, the second color filter regions 22b of the color element 22D in FIG. 3D is protruded in the beveled end-point region 24. Thus, the white open area is reduced. In addition, refer to FIG. 10, showing the thickness profile of the color element in the beveled end-point region according to the second embodiment. The color element 22D in the beveled end-point region 24 of the second embodiment has a more gradual profile than the color element 22 at the beveled side 23 of the first embodiment. Therefore, the color element 22D has longer extension distance at the corners (beveled end-point region), thus reducing white open area 26. Also, the special color element structure results in improved color properties, increased contrast ratio, and reduced light leakage.

Figure 7A:
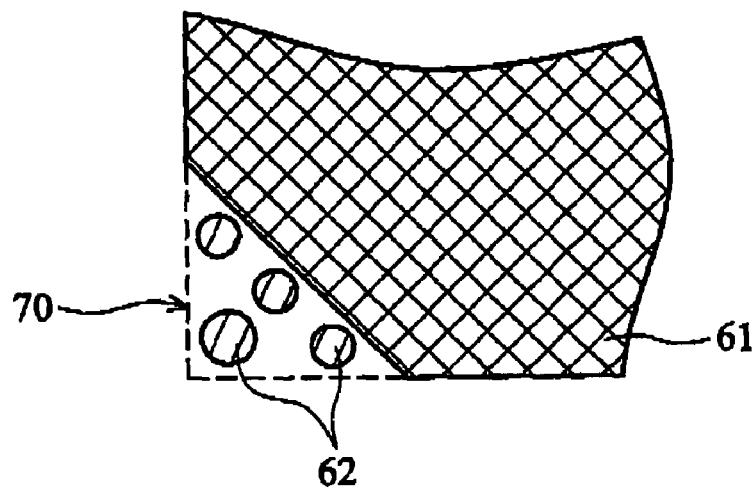
FIG. 7A through FIG. 7C are top views of a portion of the color element at the beveled end-point region.
Figure 7B:
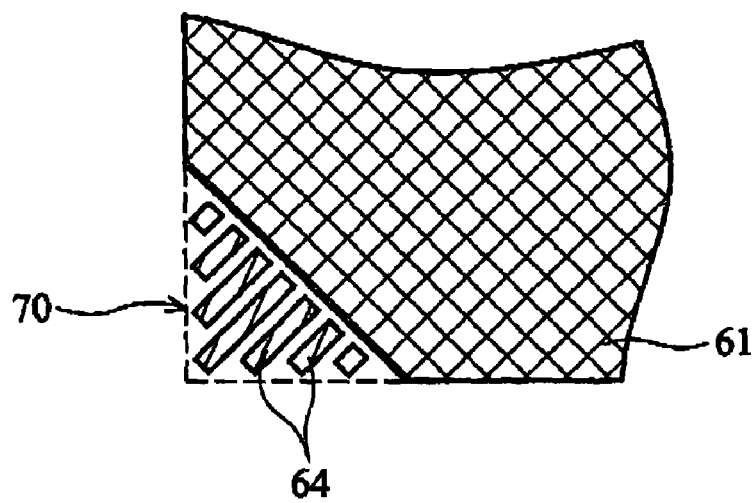
Figure 7C:
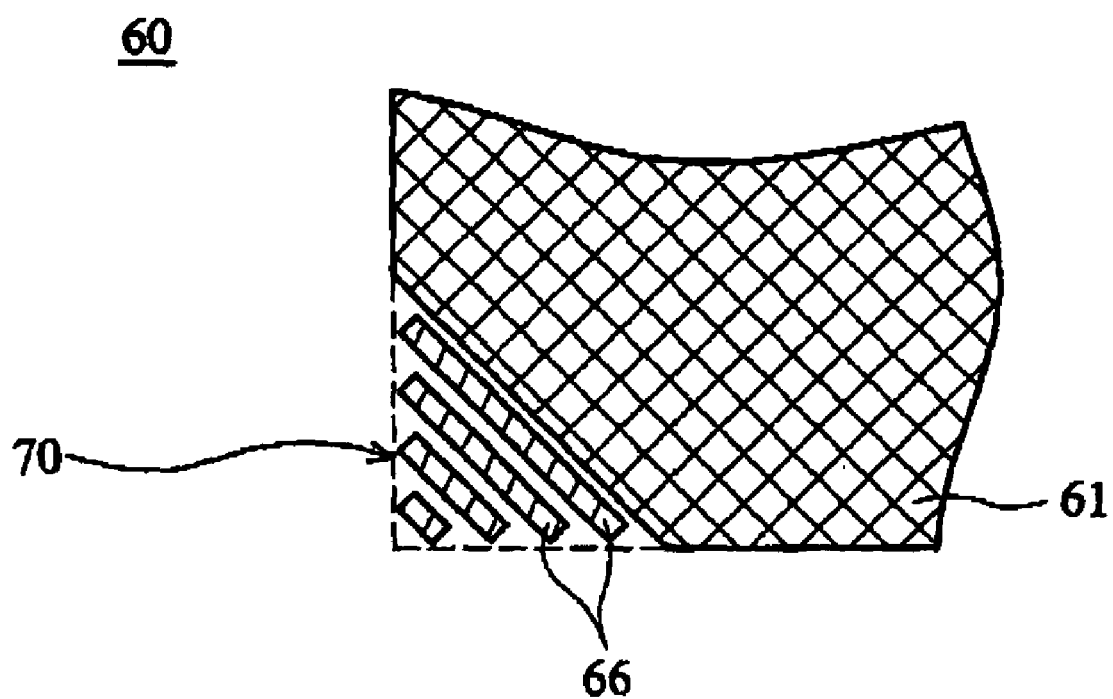

Alternatively, a color element 60 in FIGS. 7A through 7C can also be formed using mask elements 40M as shown in FIGS. 6A through 6C respectively. FIGS. 7A through 7C are partial top views of the color element 60 at the beveled end-point region 70. Referring to FIG. 7A, the color element 60 comprises a first portion 61 and a plurality of second portions 62. The first portion 61 is an octagon and the second portions 62 are disposed at the beveled end-point region 70. The second portions 62 are not connected to the first portion 61. The dimensions, size, and number of the second portions 62 are not limited in embodiments of the invention. The second portions 62 at the beveled end-point region 70 as shown in FIG. 7A are a plurality of circular openings. In FIG. 7B, the second portions 64 of the color element 60 are strip-shaped and disposed at an incline from the upper-right to the lower-left. In FIG. 7C, the second portion 66 of the color element 60 are strip-shaped and disposed at an incline from the upper-left to the lower-right.

Based on the same reasons as described, compared with the color element 22 in FIG. 3C, the second portions 62, 64, and 66 of the color element 60 can reduce the white open area 26 of a non-overlapping portion of three adjacent color elements, thus improving color properties, increasing contrast ratio, and reducing light leakage.

Figure 8A:
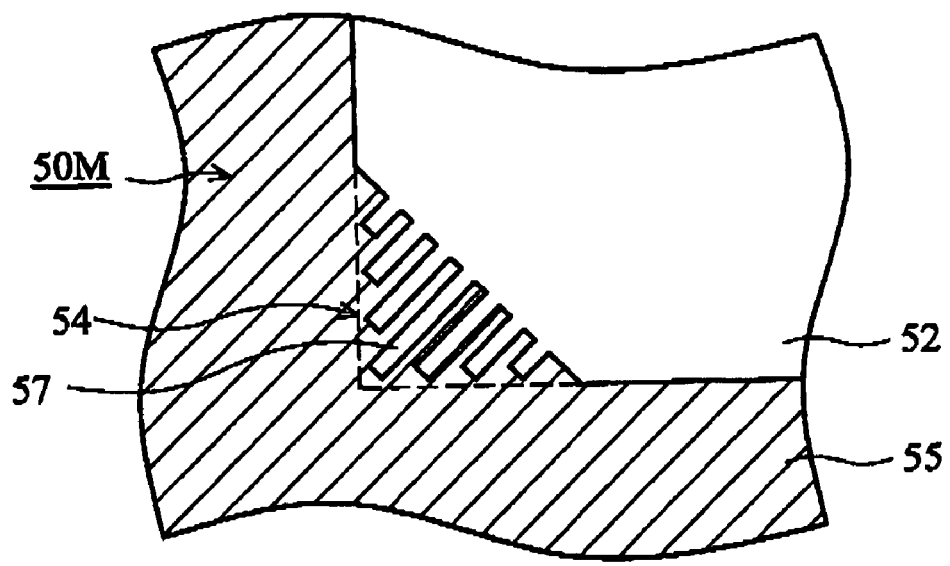
FIG. 8A through FIG. 8C are partial top views of the photo masks in accordance with embodiments of the invention.
Figure 8B:
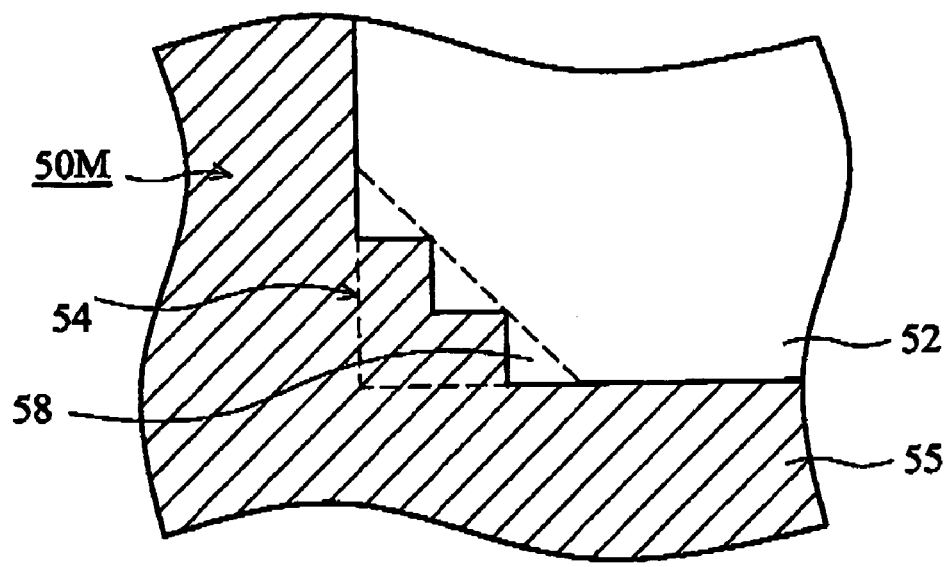
Figure 8C:
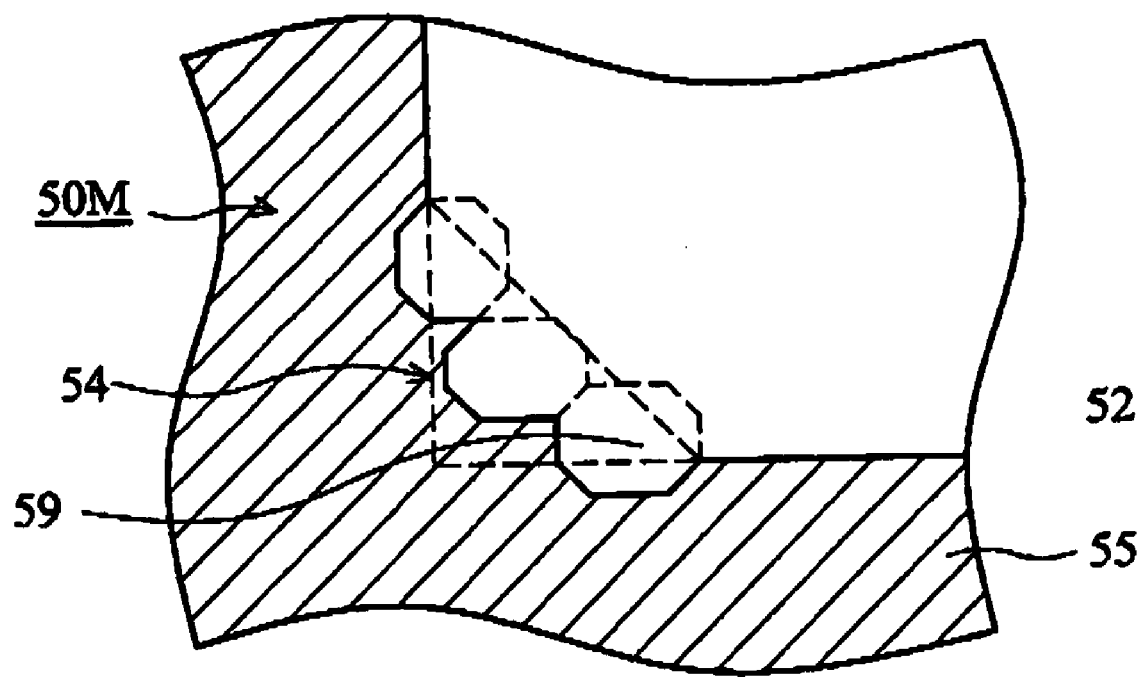

FIGS. 8A through 8C are partial top views of the photo masks in accordance with embodiments of the invention. Each beveled end-point region 54 comprises protruded openings described in the following. Referring to FIG. 8A, the photo mask comprises a plurality of mask elements 50M. Each mask element 50M comprises an octagonal first opening 52 and a plurality of second openings 57. The octagonal first opening 52 is the same octagon as in FIG. 5. The second openings 57 are disposed at the four beveled end-point regions 54. The second openings 57 are connected to the first opening 52. The dimensions, size, and number of the second openings 57 are not limited to the disclosed embodiments. The second openings 57 at the beveled end-point region 54 as shown in FIG. 8A are a plurality of strip-shaped openings.

FIGS. 8B and 8C are variations of the second openings at the beveled end-point region 54. In FIG. 8B, the second openings 58 are saw-toothed profile openings. In FIG. 8C, the second openings 59 are faceted profile openings formed by three minor octagons.

Accordingly, color filters can thus be formed using mask elements as shown in FIGS. 8A through 8C. A color element 22D in FIG. 3D can be formed using mask elements 50M as shown in FIGS. 8A through 8C.

Based on the same reasons as described, compared with the color element 22 in FIG. 3C, the second color filter regions 22b of the color element 22D can reduce the white open area of a non-overlapping portion of three adjacent color elements, thus improving color properties, increasing contrast ratio, and reducing light leakage.

Figure 9A:
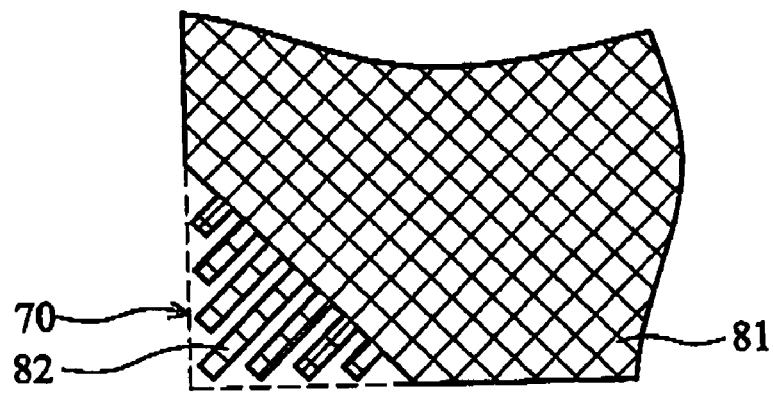
FIG. 9A through FIG. 9C are top views of a portion of the color element at the beveled end-point region.
Figure 9B:
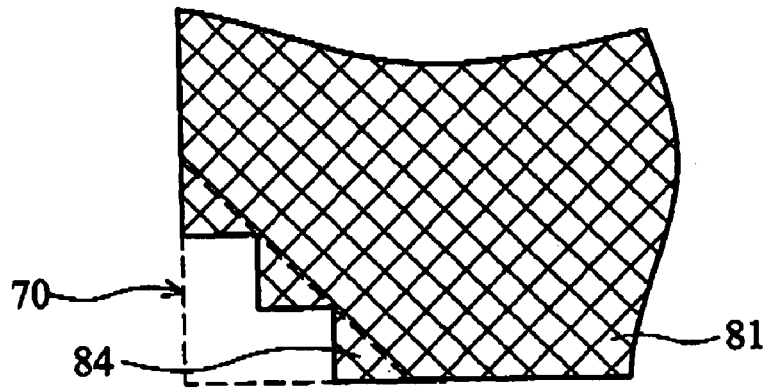
Figure 9C:
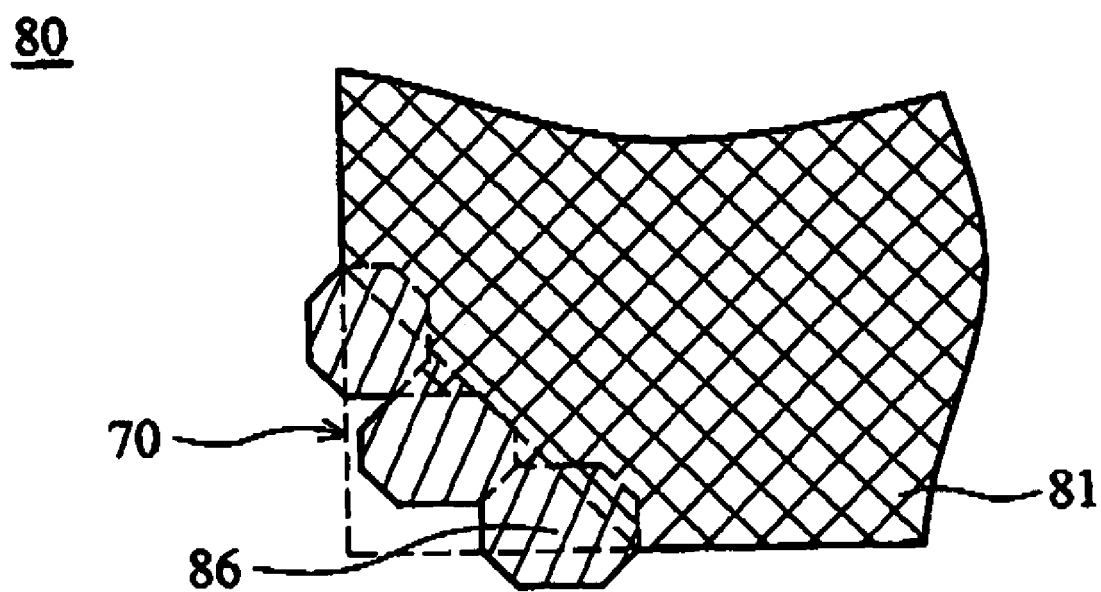

Alternatively, a color element 80 in FIGS. 9A through 9C can also be formed using mask elements as shown in FIGS. 8A through 8C respectively. FIGS. 9A through 9C are partial top view of the color elements 80 at the beveled end-point region 70. Referring to FIG. 9A, the color element 80 comprises an octagonal first portion 81 and a second portion 82. The second portion 82 is disposed at the four beveled end-point regions 70 of the octagonal first portion 81. The second portions 82 are connected to the first portion 81. The dimensions, size, and number of the second portions 82 are not limited to the disclosed embodiments. The second portions 82 at the beveled end-point region 70 as shown in FIG. 9A are a plurality of strip-shaped portions adjacent to the first portion 81. In FIG. 9B, the second portions 84 have a saw-toothed profile. In FIG. 9C, the second portions 86 have a faceted profile formed by three minor octagons.

Based on the same reasons described above, compared with the color element 22 in FIG. 3C, the second portions 82, 84, and 86 of the color element 80 can reduce the white open area 26 of a non-overlapping portion of three adjacent color elements, thus improving color properties, increasing contrast ratio, and reducing light leakage.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A structure of color elements for a color filter, comprising:
    at least a first color element, a second color element adjacent to the first color elements, and a third color element adjacent to first and second color elements, in which an overlap is formed between each two adjacent color elements to serve as a light-blocking area preventing light leakage between the color elements;
    wherein at least one color element substantially comprises a polygonal portion having at least five sides, and
    wherein each of the first color element, the second color element, and the third color element comprises a gradual rim between two adjacent color elements and a steep rim among the first color element, the second color element and the third color element.

2. The structure of color elements for a color filter as claimed in claim 1, wherein at least one color element is substantially an octagon, having four straight sides and four beveled sides.

3. The structure of color elements for a color filter as claimed in claim 2, wherein a length of the beveled side is less than 8 μm and greater than 0.

4. The structure of color elements for a color filter as claimed in claim 2, wherein an included angle between each beveled side and each straight side is less than 90° and greater than 0°.

5. The structure of color elements for a color filter as claimed in claim 2, wherein an overlap at the rim of each color element is within a range of approximately 0~10 μm.

6. A photo mask for fabrication the color filter as claimed in claim 1, comprising:
    a plurality of mask elements, each mask element comprising a first opening, wherein the first opening is a polygonal opening with at least five sides.

7. The photo mask for fabrication a color filter as claimed in claim 6, wherein the mask element further comprises a plurality of second openings disposed in a beveled end-point region of the polygonal first opening.

8. The photo mask for fabrication a color filter as claimed in claim 7, wherein the first opening is an octagonal first opening, and the second openings are disposed in four beveled end-point regions of the octagonal first opening.

9. The photo mask as claimed in claim 8, wherein the second openings are not connected to the first opening.

10. The photo mask as claimed in claim 9, wherein the second openings are a plurality of circular openings.

11. The photo mask as claimed in claim 9, wherein the second openings are a plurality of strip-shaped openings.

12. The photo mask as claimed in claim 8, wherein the second openings are connected to the first opening.

13. The photo mask as claimed in claim 12, wherein the second openings are a plurality of strip-shaped openings.

14. The photo mask as claimed in claim 12, wherein the second openings are saw-toothed profile openings.

15. The photo mask as claimed in claim 12, wherein the second openings are faceted profile openings.

16. A method for fabricating the color filter as claimed in claim 1, comprising:
    providing a first substrate comprising a plurality of pixel regions, each pixel region further comprising three sub-pixel regions;
    sequentially forming a first color element, a second color element, and a third color element layer using a photo mask on each sub-pixel region of the first substrate;
    wherein the photo mask comprises a plurality of mask elements, each mask element comprising a first opening, wherein the first opening is a polygonal opening with at least five sides.

17. The method as claimed in claim 16, wherein the mask element further comprises a plurality of second openings disposed in a beveled end-point region of the polygonal first opening.

18. The method as claimed in claim 17, wherein the first opening is an octagonal first opening, and the second openings are disposed in four beveled end-point regions of the octagonal first opening.

19. The method as claimed in claim 18, wherein the second openings are not connected to the first opening.

20. The method as claimed in claim 19, wherein the second openings are a plurality of circular openings.

21. The method as claimed in claim 19, wherein the second openings are a plurality of strip-shaped openings.

22. The method as claimed in claim 18, wherein the second openings are connected to the first opening.

23. The method as claimed in claim 22, wherein the second openings are a plurality of strip-shaped openings.

24. The method as claimed in claim 22, wherein the second openings are saw-toothed profile openings.

25. The method as claimed in claim 22, wherein the second openings are faceted profile openings.

26. A structure of color elements for a color filter, comprising:
    at least a first color element, a second color element adjacent to the first color element, and a third color element adjacent to the first and second color elements, in which an overlap is formed between a side of each two adjacent color elements to serve as a light-blocking area preventing light leakage between the overlapping sides;
    wherein at least the first color element substantially comprises a polygonal first portion having at least five sides, and a plurality of spatially separated second portions disposed in a beveled end-point region of the polygonal first portion adjacent to the second and third color elements, wherein the separation between the second portions defines a plurality of gaps in the material continuity of the first color element.

27. A structure of color elements for a color filter as claimed in claim 26, wherein the polygonal first portion of the color element is an octagonal first portion, and the second portions are disposed in four beveled end-point regions of the octagonal first portion.

28. A structure of color elements for a color filter as claimed in claim 27, wherein the second portions are not connected to the octagonal first portion.

29. The structure of color elements for a color filter as claimed in claim 28, wherein the second portions of the color element comprises a plurality of circular portions.

30. The structure of color elements for a color filter as claimed in claim 28, wherein the second portions of the color element comprises a plurality of strip-shaped portions.

31. A structure of color elements for a color filter as claimed in claim 27, wherein the second portions are connected to the octagonal first portion, such that the profile of the first color element at the beveled end-point region of the polygonal first portion includes a plurality of indentations defined by the claps between the second portions.

32. The structure of color elements for a color filter as claimed in claim 31, wherein the second portions of the color element comprises a plurality of strip-shaped portions.

33. The structure of color elements for a color filter as claimed in claim 31, wherein the second portions of the color element are of a saw-toothed profile.

34. The structure of color elements for a color filter as claimed in claim 31, wherein the second portions of the color element are of a faceted profile.

35. The structure of color elements for a color filter as claimed in claim 27, wherein an overlap at the rim of each color element is within a range of approximately 0~10 μm.

36. A structure of color elements for a color filter as claimed in claim 26, wherein the second portions are arranged to reduce an open area of a non-overlapping portion between the first, second and third color elements.

* * * * *